(12) United States Patent
Fuchs et al.

(10) Patent No.: US 7,156,780 B1
(45) Date of Patent: Jan. 2, 2007

(54) DRIVE SYSTEM OPERATED BY MUSCLE-POWER

(75) Inventors: Andreas Fuchs, Bern (CH); Jürg Blatter, Thun (CH)

(73) Assignee: SwissMove AG, Zurich (CH)

( * ) Notice: Subject to any disclaimer, the term of this patent is extended or adjusted under 35 U.S.C. 154(b) by 0 days.

(21) Appl. No.: 09/937,945

(22) PCT Filed: Mar. 30, 2000

(86) PCT No.: PCT/CH00/00189

§ 371 (c)(1),
(2), (4) Date: Oct. 2, 2001

(87) PCT Pub. No.: WO00/59773

PCT Pub. Date: Oct. 12, 2000

(30) Foreign Application Priority Data

Apr. 3, 1999 (SE) .......................... 639/99

(51) Int. Cl.
*A63B 21/00* (2006.01)
*A63B 22/06* (2006.01)
(52) U.S. Cl. .......................................... 482/92; 482/63
(58) Field of Classification Search ............ 482/51–57, 482/61–65, 1–8
See application file for complete search history.

(56) References Cited

U.S. PATENT DOCUMENTS

| | | | | | |
|---|---|---|---|---|---|
| 4,709,917 | A | * | 12/1987 | Yang ............................ | 482/63 |
| 4,938,474 | A | * | 7/1990 | Sweeney et al. .............. | 482/52 |
| 5,199,931 | A | * | 4/1993 | Easley et al. ................. | 482/52 |
| 5,213,555 | A | * | 5/1993 | Hood et al. ................... | 482/57 |

* cited by examiner

*Primary Examiner*—Gregory Huson
*Assistant Examiner*—Fenn C. Mathew
(74) *Attorney, Agent, or Firm*—Rankin, Hill, Porter & Clark LLP

(57) ABSTRACT

An electric drive system (1) operated by muscle power for a vehicle (2) includes a foot pedal (5) and a mechanical generator (6) mechanically connected to the foot pedal. The drive system also includes an electric transmission (4) and an electric control system (20) with a control program (21) of the generator, which is able to generate a counter or load moment (GM). The drive system also includes a starting control system (22) for the generator, by means of which a standstill pedal resistance (TW) and a high starting moment (MA) is produced at the foot pedal. When used in a stationary training apparatus (3), the drive system includes a motor operation control system (23) with a bi-directional converter (31), by means of which the generator is also able to be operated as a motor.

21 Claims, 5 Drawing Sheets

US 7,156,780 B1

DRIVE SYSTEM OPERATED BY MUSCLE-POWER

BACKGROUND OF THE INVENTION

1. Field of the Invention

The invention presented here is related to an electric drive system operated by muscle-power for a vehicle.

2. Description of Related Art

From EP 0784008, for example, a drive system of this kind is known in a bicycle with a foot pedal and a generator mechanically connected with the foot pedal system as well as with an electric transmission to a controllable drive motor as electric consumer. These known drive systems with electric transmission, however, have decisive disadvantages. Thus, in particular also the starting, resp., the treading down on the pedal from standstill is not solved, inasmuch as the driver first practically is treading into a void, i.e., the foot pedal when treading down first offers practically no resistance, until the generator has been accelerated to a sufficiently high speed. This absolutely unaccustomed lack of a pedal resistance when starting represents a great risk. It can lead to the consequence, that the rider loses his balance and falls with his bicycle. Over and above, with this also the immediately required adequate starting power cannot be generated with the generator and finally this previous, normal generator characteristic also goes counter to any accustomed riding sensation, which a rider quite naturally expects of a mechanical pedal drive. I.e., the starting characteristic of these electrical drives known up until now in no way corresponds to an ergonomically required characteristic and is also in crass contradiction to the accustomed starting characteristic in the case of mechanical pedal drives.

The known electrical drive systems on the other hand, however, are also not suitable for use in training apparatuses, inasmuch as for the generator an additional effort is required compared with purely mechanically operated training apparatuses, without this already leading to the achievement of essential improvements to the use, resp., to an extension of the applications. A very great disadvantage of previous training apparatuses above all consists in the fact, that with them only a very limited one-sided action is possible, so that the stationary training very rapidly becomes boring and such training apparatuses therefore after initial use are thereupon made use of only rarely or even not at all. It therefore would represent a very important objective, to design training apparatuses to be more attractive, versatile in use and more entertaining, so that they are utilised more and regularly and that with them also a more universal application would be possible.

SUMMARY OF THE INVENTION

For this reason, it is the objective of the invention presented here to create an electric drive system for vehicles that has a favourable ergonomic starting characteristic corresponding to the previous experience and habituation.

This objective is achieved by a drive system in accordance with the invention according to claim 1. The dependent claims are concerned with advantageous further developments of the invention, which comprise an especially favourable and ergonomic starting characteristic and with the possibility of universal utilisation for any kind of training as well as alternative embodiments, which comprise particular advantages with respect to ease of manufacture as well as further applications and types of therapy.

BRIEF DESCRIPTION OF THE DRAWINGS

In the following, the invention is explained in more detail in connection with the Figures on the basis of examples. These illustrate.

DETAILED DESCRIPTION OF THE PREFERRED EMBODIMENTS

Figure 1:
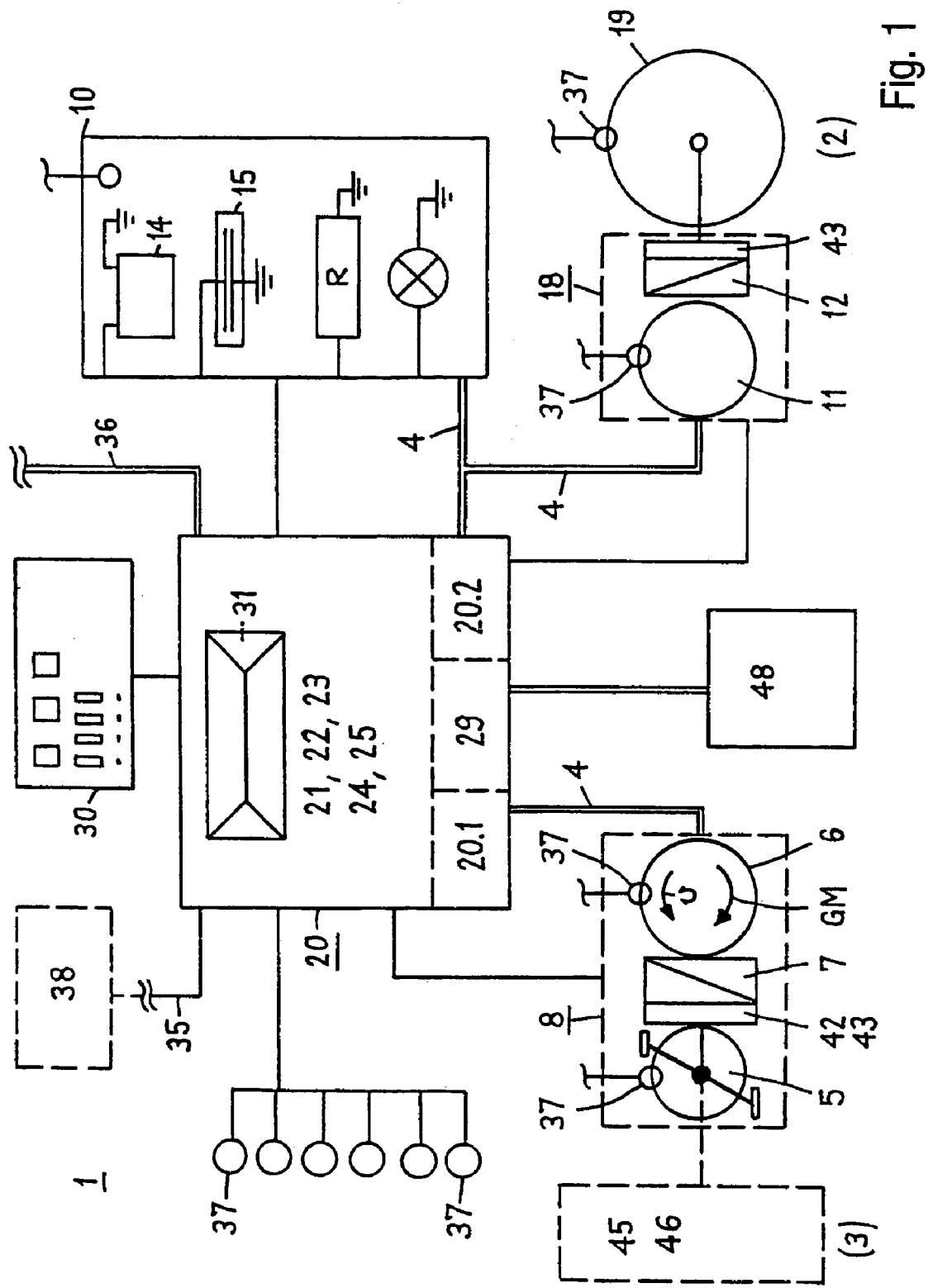
FIG. 1 a schematic diagram of a drive system in accordance with the invention for vehicles and/or stationary training devices.

FIG. 1 depicts an electric drive system according to the invention 1 for vehicles and/or stationary training apparatus with a foot pedal 5 as a muscle-power driven drive unit and a generator 6 mechanically connected with the foot pedal as well as with an electric transmission 4 from the generator 6 to an electric consumer 10 and/or to a drive motor 11 as well as with an electric control system 20. The electric control system 20 comprises a control program 21 of the generator 6, with which a counter- or load moment GM relative to the forward pedalling direction v can be generated. Wherein the drive system, utilised in a vehicle 2 (e.g., FIGS. 7 and 8), comprises a starting control 22 of the generator 6, with which with an action on the foot pedal 5 from standstill an immediately occurring pedal resistance TW is produced and with which a high starting moment MA is generated at the foot pedal when starting from standstill, until a minimum driving speed Vmin, resp., a normal pedalling frequency f is reached, as is illustrated further with the FIGS. 2 to 5. For the use in a stationary training device 3, the drive system 1 as counter- or load moment GM comprises a motor operation control 23 with a bidirectional converter 31, with which the generator 6 can also be operated as a motor, with controlled coupling and uncoupling of electric power, in particular also for eccentric training. This is explained in more detail on the basis of FIG. 6. FIG. 1 further depicts a generator transmission 7 between a foot pedal 5 and generator 6 and a free-wheel system 42 blockable through a program of the control system 20 or a switchable clutch 43. Foot pedal and generator can form a generator module 8 as a separate sub-assembly. For the application in vehicles 2, the motor 11 can have a speed-reducing motor transmission 12 to a drive wheel 19, which can also be designed as a separate sub-assembly, i.e., as motor module 18. As electric consumers 10, a vehicle also comprises an accumulator as an electric storage device 14 and/or a super capacitor 15 for particularly rapid discharge processes in case of a high power requirement of the motor and for rapid charging in case of electric recuperation braking. When used in stationary training apparatus, further electric consumers, e.g., electric brakes, also, however, mechanical brakes 45 and mechanical storage apparatus 46 can serve to dissipate the energy generated at the foot pedal in concentric training operation. Sensors and measurement transducers 37, e.g., on the foot pedal 5, on the generator 6, on the motor 11 and on the drive wheel 19 as well as on further components of the drive systems are connected with the control system 20 and serve to monitor and control the operation. For this purpose, operating programs 24 for training apparatus as well as driving programs 25 for applications in vehicles are included in the control system 20. An input- and display device 30 serves for the selection of the driving- and operating programs as well as for the display of driving- and operating data, which can be stored in an internal data storage device 29. An interface 35 for the connection to an external apparatus 38, e.g., to a PC, serves for the further controlling, programming and evaluation. A mains power connection 36 can be utilised for the charging of electric storage apparatus 14, 15 as well as, during eccentric training, for operating the generator 6 as a motor.

Depending on the application, it is also possible to connect additional energy sources 48, e.g., a light petrol (gasoline) engine unit as a "range extender", or foldable solar cells.

Figure 2:
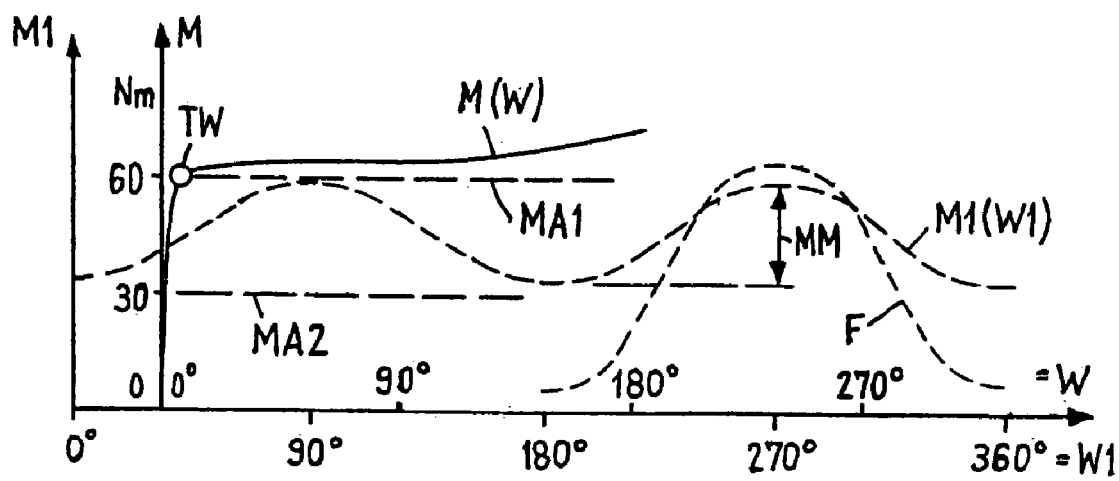
FIG. 2 the generator moment in function of the angle of rotation of the pedal when starting.
Figure 3:
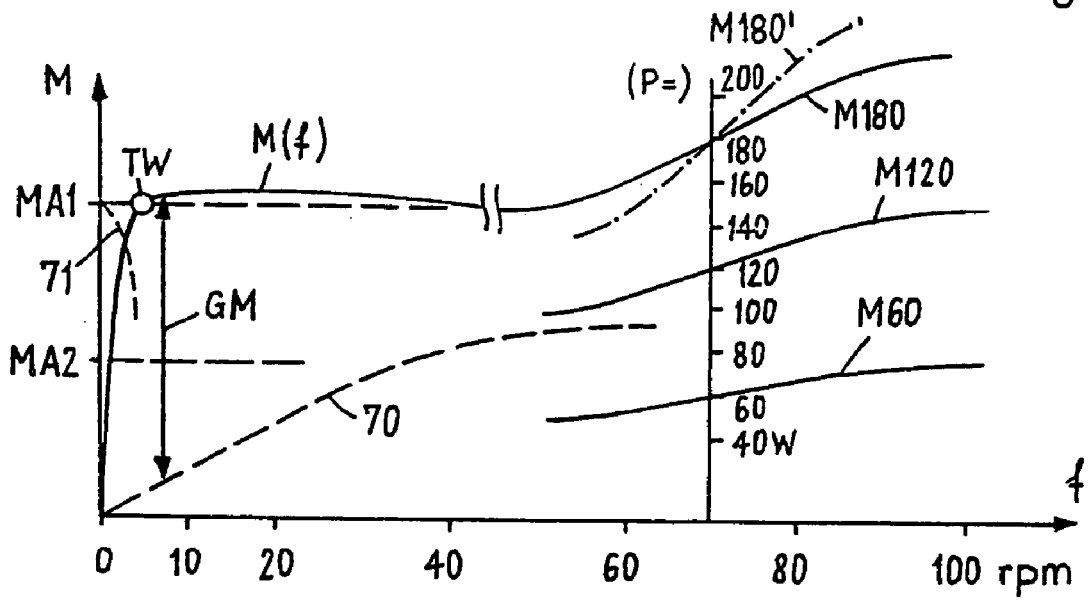
FIG. 3 the generator moment in function of the pedalling frequency.

In the case of previous pedal generator drives with electric transmission, practically no pedal resistance is perceivable in standstill and the resistance or load moment of the generator when starting to pedal is very small, until a sufficient pedalling frequency has been reached, i.e., the rider when starting first of all is treading into a void (curve 70, FIG. 3). On the contrary, however, a user in the case of every mechanical pedal drive operated with muscle-power and especially in the case of a bicycle (with or without electric transmission) expects a standstill treading resistance and a high starting moment or torque from standstill, so that already the first half revolution, i.e., from a pedal position on top to one at the bottom has a high resistance or load moment. This is doubly necessary for normal bicycles with an upright sitting position, so that a user during starting can support himself on the pedal and so that the pedalling from standstill of the bicycle up to a minimum stable riding speed Vmin of, e.g., 2 m/sec can take place rapidly and with relatively great starting resistance or load and with a perceivable acceleration by pedalling. Otherwise there is the danger, that the rider may slide off the pedals, resp., may fall. A perceivable, sufficiently great starting resistance or load, however, is not only expected and demanded for normal riders (in accordance with 7): Also for reclining bicycle positions, resp., multi-track vehicles (FIG. 8), in the case of which there is no danger of tipping over, when starting from standstill with mechanical muscle-power drives on principle the same characteristic is anticipated, i.e., a sufficiently high starting resistance or load moment MA has to be perceivable. For this reason, in principle with this also the lacking direct coupling of the pedal 5 with the drive wheel 19 (because the bicycle chain has after all been replaced by the electric transmission 4) according to the invention has to be replaced by a reasonable pedal resistance at standstill TW and a high starting moment MA. With this, also the accustomed and anticipated ergonomic riding sensation can be produced. This is further expounded on the basis of the FIGS. 2–5.

Figure 7:
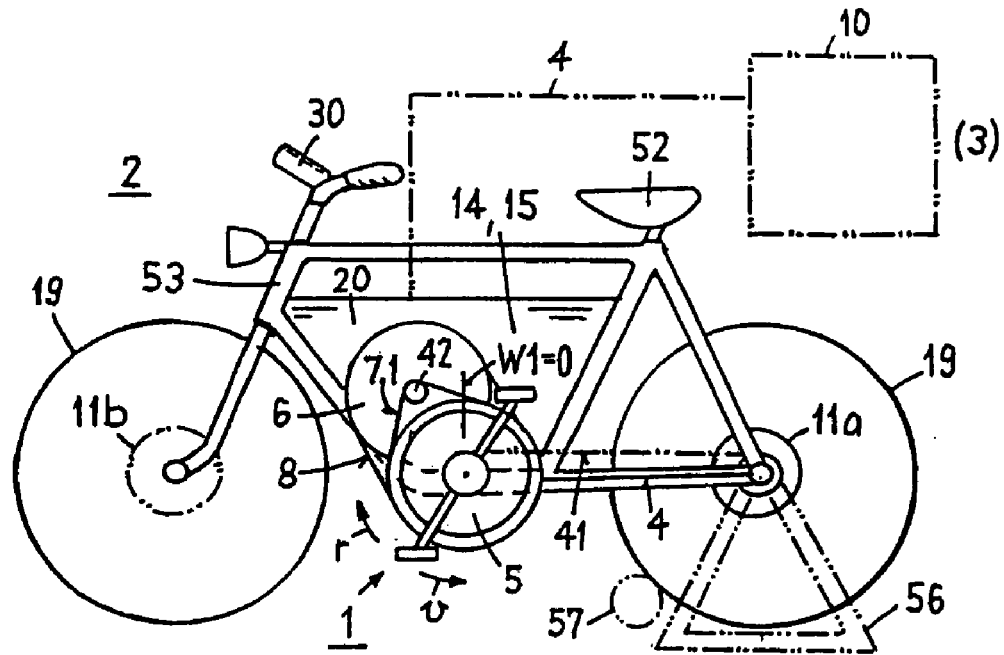
FIG. 7 a bicycle with drive modules.
Figure 8:
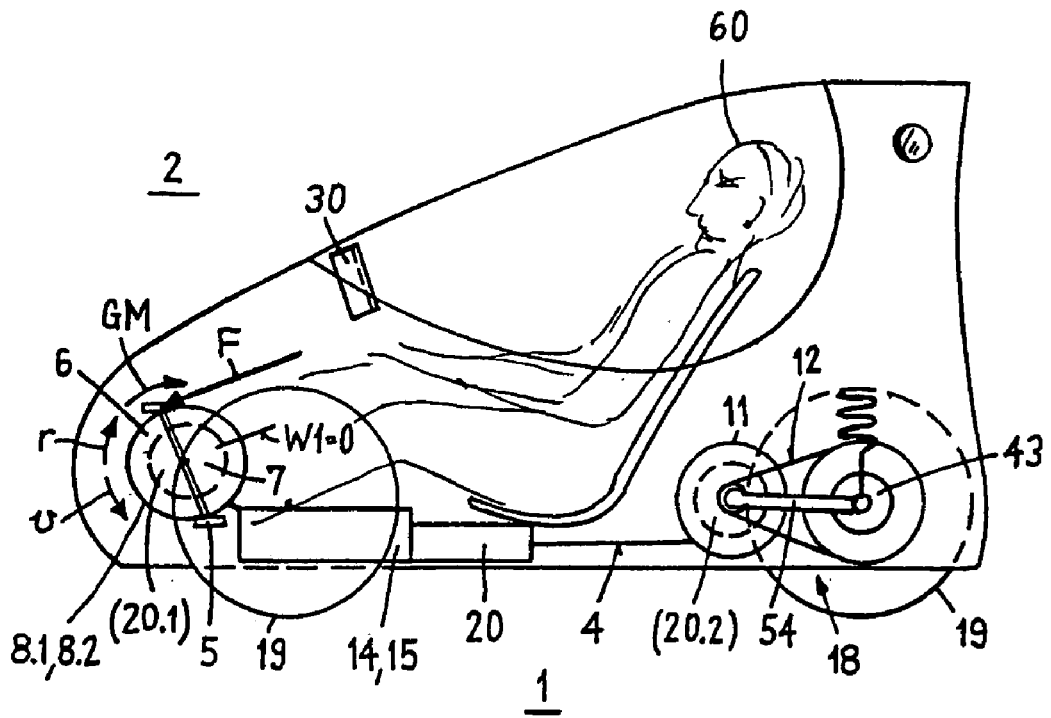
FIG. 8 a multi-track vehicle with rocker drive.

FIG. 2 illustrates the characteristic curve of the resistance or load moment M produced by the generator 6 on the tread pedal in function of the angle of rotation of the pedal. Designated as W1 is the pedal starting angle referred to the upper dead centre of the muscle-powered drive as fixed zero point (W1=0°) (refer to FIGS. 7 and 8). The pedal angle W in contrast refers to the starting with W=0. Prerequisite is, that starting takes place with sufficient force, resp., moment (torque) and angular acceleration. In accordance with curve M(W), the generator is designed and controlled in such a manner, that relatively quickly a high pedalling resistance TW and subsequently a high resistance or load moment MA is reached, i.e., e.g., within 0.1 rad, resp., within a few degrees, e.g., 5°–8°, and that this desired value of the starting moment MA is also not fallen below in the further course of starting, but is increasingly exceeded. In FIG. 2, as an example, a high desired value MA1 of, e.g., 60 Nm for the operation in normal bicycles (according to FIG. 7) and a lower value MA2 of, e.g., 30 Nm for three- or fourwheel vehicles in accordance with FIG. 8 is indicated, in preference the starting moment MA at the pedal amounts to at least 20–40 Nm for multi-track vehicles and, e.g., at least 40–60 Nm for normal bicycles. Correspondingly also the pedal resistance TW, e.g., can be adjusted to at least 150–300 N, resp., 300–400 N.

This according to FIG. 3 results in a moment characteristic M(f) (including counter or load moment GM) on the foot pedal 5, which when starting from standstill increases very rapidly, e.g., already at a speed of 10 rpm to the adjusted desired value of the starting moment MA1, resp., MA2 and with which also the desired pedal resistance at standstill TW is present. After starting, in normal riding usually the ride is with a significantly lower average treading moment M, e.g., with 10–20 Nm at 60 rpm. In the range of the normal pedalling frequency of, e.g., 50–100 rpm, thereupon the generator moment M in preference clearly increases in function of the pedalling frequency f, so that with increasing pedalling frequency an over-proportional increase of power at the generator results. The control program 21 of the generator, resp., the driving programs 25 advantageously can comprise a step changeover, which in principle is similar to a multi-speed mechanical gear transmission. In this, for example, different tightly spaced power stages of 40, 60, 80, 100, 120, 140, 160, 180, 200 W (muscle-power), etc., can be adjustable, referred to a certain normal speed of, e.g., 70 rpm, corresponding to the characteristic curves M60 . . . M120 . . . M180 for normal riding. In contrast to a mechanical gear change, these electric steps can be uniformly optimally graded and the electric changeover between the steps takes place without an interruption and evenly. This moment characteristic M(f), depending on the type and the foreseen use of the vehicle as well as in correspondence with the user preferences, can be adjusted, resp., programmed within wide ranges. Thus, i.e., the normal pedalling range, the increase of the moment in the pedalling range, i.e., the characteristic, and the number and ratio of the different power stages can be selected, resp., adjusted. For example, a flat gradient, in the normal case a medium gradient approximately according to curve M180 or also a relatively steep gradient in accordance with curve M180' can be selected. Over and above this, the generator control system is designed in such a manner, that the range of the maximum efficiency of the generator corresponds to the selected range of the pedalling frequency, so that with this during riding practically always the best possible power yield is achieved. The normal pedalling range, as already mentioned, lies between approx. 50–100 rpm, for very sporty riders rather higher, e.g., between 70 and 100 rpm, and for normal riders rather lower, e.g., between 50 and 80 rpm.

Figure 6:
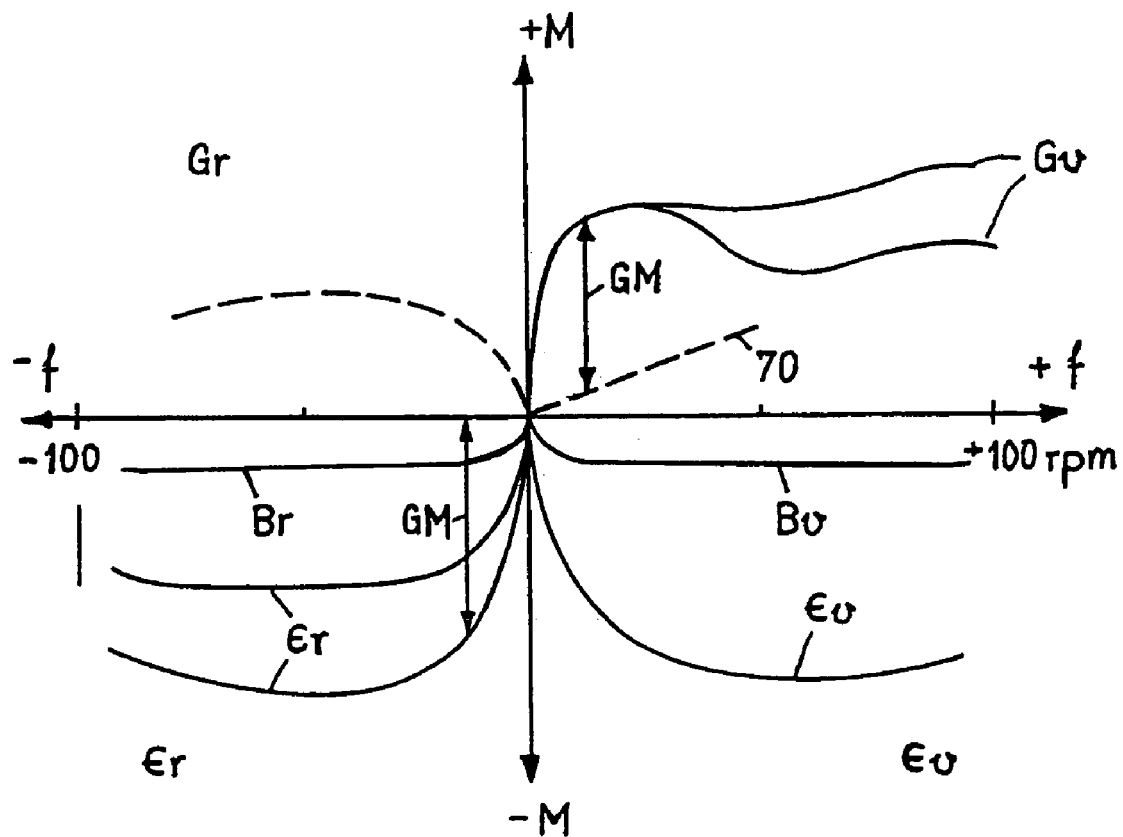
FIG. 6 the generator moment in function of the pedalling frequency in the motor operating mode for eccentric training.

The curves 70 in contrast illustrate a moment characteristic M of a previous generator drive in FIGS. 3 and 6, in function of the angle W, resp., of the pedalling frequency f, as is known, e.g., from EP 0784008. The difference between the two moment curves corresponds to the counter or load moment GM. In the case of these previous drives (without counter or load moment) according to curve 70 the resistance or load moment of the generator at the beginning when starting from standstill is very low and only quite a bit later on, i.e., after starting reaches sufficiently high values. Ergonomic and safe starting is not possible in this case. This is, because the pedal initially at least with the first treading of the pedal falls through practically without any perceivable resistance, e.g., through an angle W of 1 to 2 rad (60° to 120°), which causes a cyclist to lose his balance, so that he is likely to fall.

FIG. 2 as a further development of the invention also depicts a moment characteristic M1 (W1), whereby the resistance or load moment M1 is modulated in phase with the pedal angle W1. In doing so, the resistance or load moment M1, e.g., in the top- and bottom pedal dead centre points with W1=0° and 180° is minimal and in between at W1=90° and 270° its maximum is reached, i.e., there, where also the equally indicated tangential pedal forces F are at a minimum, resp., maximum. M1 can also be modulated with a phase shift, e.g., with a minimum at W1=5° and 185°. This modulation component MM can also be selected, resp., adjusted and MM, e.g., can be equal to 30–60% of the maximum value of M1. Also with this modulation of M1, the accustomed riding- and pedalling sensation can be produced. The accustomed uniform cyclic running, as in the case of a purely mechanical foot pedal drive, is on the one hand achieved by the mass inertia of the pedalgenerator module 8 and on the other hand by this possible additional modulation M1 (W1).

Figure 4:
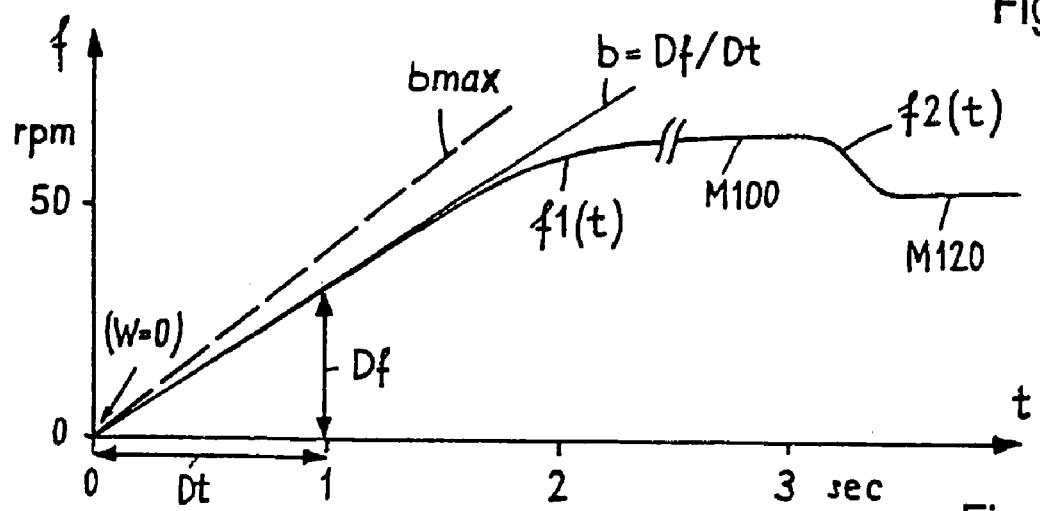
FIG. 4 a characteristic over time of the pedalling frequency when starting.

FIG. 4 illustrates the according to the invention ergonomic and safe starting characteristic by means of an illustration of the characteristic in function of time of the pedalling frequency f(t). When starting from standstill (at W=0, f=0) with a sufficiently great actuation force F, resp., starting moment M on the pedal 5, the frequency increases uniformly in accordance with curve f1(t), until the normal pedalling frequency after, e.g., 1–3 sec, is reached. Essential is, that in doing so the starting angle acceleration b=Df/Dt is limited. By means of the generator control (20.1, 21), a maximum acceleration bmax of, for example, 3–5 rad/sec$^2$ is predefined or adjusted (for an actuation moment M of, e.g., 50 Nm). In preference this maximum acceleration bmax amounts to, e.g., 4 rad/sec$^2$ (on average, e.g., over a 90°-revolution of the pedal). In correspondence with the desired application, e.g., a high starting moment MA1 (refer to FIGS. 2 and 3) with a very low maximum acceleration of bmax=3 rad/sec$^2$ or a low starting moment MA2 corresponding, e.g., to a borax of 5 rad/sec$^2$ can be adjusted. A normal pedalling frequency of, e.g., 60 rpm (corresponding to approx. 6 rad/sec) with this would therefore only be reached after approx. 1.2–2 sec. After the starting, in normal riding condition, as explained in the context of FIG. 3, in preference a changeover between different riding steps can be made, which, for example, is illustrated in the function f2(t), with a changeover from the characteristic M120 to the characteristic M100, which corresponds to changing down. This electric changeover with a continuing pedalling motion takes place with a constant force and without any interruption or pauses for changeover.

Figure 5:
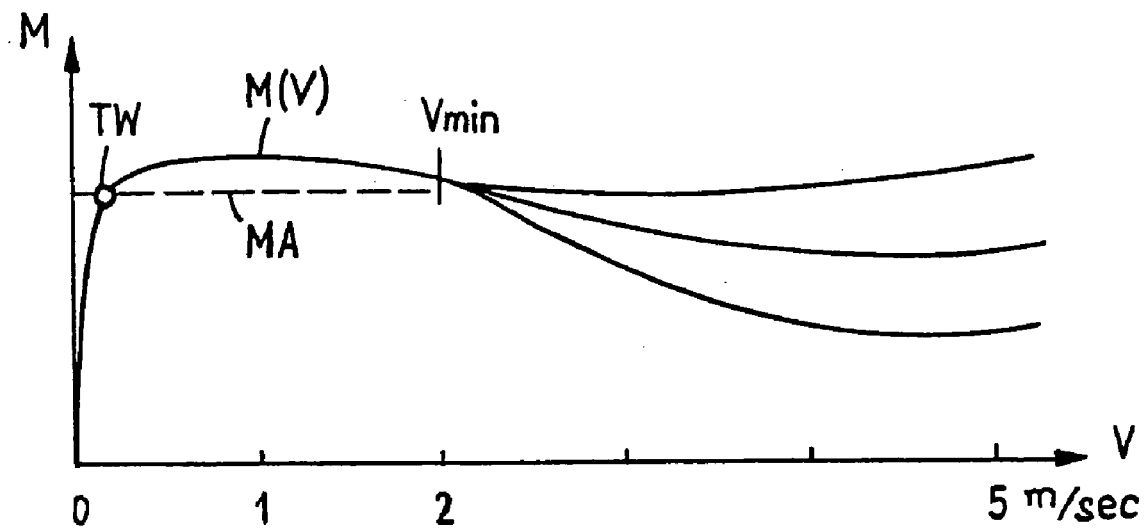
FIG. 5 the generator moment in function of the speed.

A further illustration of the starting, above all for normal bicycles, is depicted in FIG. 5, where the moment characteristic M(V) is illustrated in function of the speed V. From it, it is also evident, that as from speed 0 at the start, immediately a sufficiently high starting moment MA has to be reached. This not only for reasons of stability and ergonomics, but also, in order to with the generator immediately supply a high starting power corresponding to the high moment M for a rapid acceleration of the vehicle to a minimum stable riding speed Vmin. To achieve this, also battery current can be made use of in support. This in the case of a bicycle amounts to approx. 2–3 m/sec. After the start, i.e., in normal running operation, in most cases one rides with a significantly lower pedal moment M, e.g., with 15 Nm corresponding to a pedalling power of approx. 100 W at 60 rpm. Without this generator control system in accordance with the invention, a bicycle at first in essence would have to be accelerated to the minimum speed Vmin using solely energy from a battery, while the rider first would be treading into a void, as is illustrated by curve 70 in FIG. 3. This ergonomically and from the point of view of energy would run counter to nature and would be absolutely nonsensical. The result would also be a riding sensation so bad and insecure, that quite likely hardly any users and buyers would be able to be found.

The ergonomic starting characteristic described in the context of the FIGS. 2–5, is of course in the first instance necessary for the application of the drive system in vehicles. In the case of stationary training- and rehabilitation apparatuses, where there is no danger of tipping over for the rider and where no adequate starting acceleration has to be achieved, while this accustomed ergonomic starting characteristic of the muscle-powered drive is desirable, it is, however, not an indispensable necessity. In order for an electric generator drive to make sense there, its fields of application in comparison with known, simple, purely mechanical apparatuses have to be significantly broader and more attractive. This is explained on the basis of FIG. 6, which depicts various possible modes of operation of the generator drive. Here the moment characteristic M(f) in function of the pedalling frequency f is illustrated in both directions (v=forwards pedalling direction with frequency +f and r=backwards or reverse pedalling direction with frequency −f). In this, the generator is in generator operation, i.e., with a resistance or load moment +M (for concentric training in accordance with curves Gv, Gr) as well as in operation as a motor with moment −M (for eccentric training according to curves Ev, Er).

The curve Gv corresponds to the normal generator drive in vehicles, which, however, can also be utilised on a stationary training apparatus, e.g., with selectable drive programs 25. I.e., a vehicle, e.g., a bicycle, also, however, a light tricycle, can be utilised both as a vehicle as well as also as a stationary training apparatus. Thus when the weather is bad, e.g., a bicycle can be put on a stand in the house and with it any riding programs desired can then be carried out (FIG. 7). The generator in principle can also be operated in reverse in accordance with curve Gr (concentric training with backwards pedalling).

According to FIG. 6, the generator drive in principle is designed for 4-quadrant operation (Gv, Gr, Ev, Er), wherein the counter or load moment GM is generated in the quadrants Gv and Er. In the simplest case, the generator, operated as a motor, is utilised for exercise therapy in accordance with the curves Br, By in both directions r and v. This only serves to move the limbs (legs, arms or body), essentially without the application of musclepower, e.g., for a rehabilitation of the ability of movement. The operation of the generator 6 takes place through the bi-directional converter 31, resp., the generator control system 20.1 and the generator control program 21. Starting out from the pure exercise therapy in accordance with curves Br, Bv, the braking muscle-power utilised can be increased at will by means of an adjustable and also programmable moment characteristic −M according to the curves Er and Ev. Therefore any selectable and controllable eccentric programs can be run.

Figure 11:
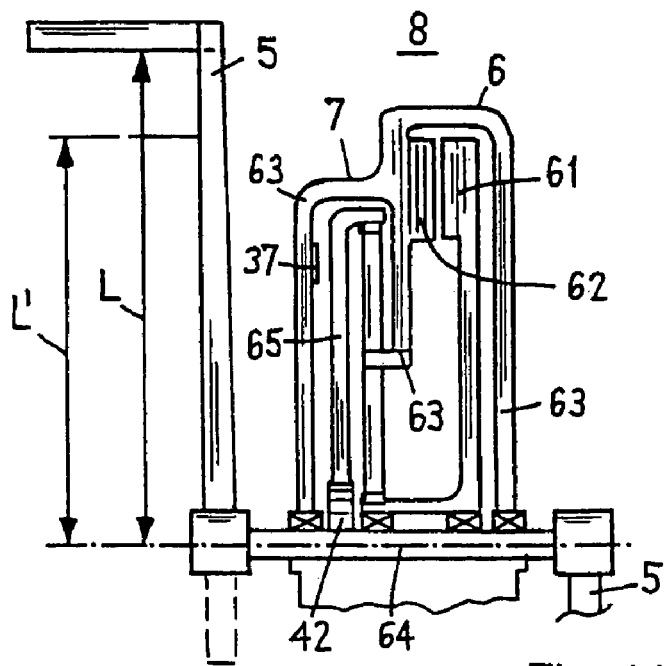
FIG. 11 a flat pedal generator module.

Instead of a pedal crank drive, of course also other types of muscle-power drives can be utilised in an analogue manner, e.g., linear drives, rowing drives, etc., which are driven by means of leg-, arm- or body movements. Above all for therapeutic applications, in doing so the geometry of the muscle-powered drive can also be designed to be adjustable. In this respect, both the excursion or pedal radius L of the drive movement (L, e.g., corresponds to the radius of a pedal crank, FIG. 1, 11) as well as the position of the user relative to the drive can be adjustable. Thus the movement amplitudes L can be variable for therapy and training (FIG. 11). As a further safety element, e.g., for eccentric training, a characteristic Er, Ev can be controlled in such a manner, that the driving movement of the pedal generator is immediately stopped, in order to prevent injuries, if the user slips off the pedal, resp., if his muscle-powered braking is suddenly interrupted. To achieve this, a suitable sensor 37 is utilised, which detects the change in force.

In the case of eccentric training Er, Ev, relatively high muscle forces and powers can be utilised with an essentially lower burden on the blood circulation in comparison with concentric training. I.e., to brake the same motor power of the generator requires a much lower effort than to produce it (in principle this corresponds to the experience, that to climb a staircase requires much more effort than to run down it at the same speed). For this reason, the eccentric training (apart from the athletics training) above all in the cardiovascular therapy provides a very great benefit, resp., opens up new and essentially better possibilities for therapy.

FIG. 7 illustrates a normal bicycle with a drive system 1 comprising modules. On a chassis 53 with a seat 52, a pedal generator module 8 is attached as a sub-assembly, which here comprises a foot pedal 5, a synchronous belt drive 7.1, possibly a blockable free-wheel system 42 and a generator 6. The electric control system 20 as well as the electric storage devices 14, resp., advantageously also a super capacitor 15 and an input- and display element 30 can also be attached to the chassis as modules or subassemblies, which can be separated from it. The electric transmission 4 provides the energy required to a drive motor 11a, which here in the rear wheel 19 is designed, e.g., as a wheel hub motor. In order to achieve optimum efficiencies of the drive motors, e.g., also two differently designed motors 11a and 11b can each respectively be foreseen for a higher and a lower speed range, which is indicated here with a possible additional motor 11b in the front wheel, or else a motor with switched windings can be utilised, which are optimised for differing speed ranges.

A bicycle of this kind can in addition be utilised as a stationary training apparatus in the house, e.g., fixed on a training stand 56. If this stand comprises a braking roller 57, then riding programs can also be carried out with the motor 11a or else an electric consumer 10 can also be directly connected.

FIG. 7 also depicts an additional possible variant, in order to generate a standstill treading resistance TW and for very few revolutions a high starting moment MA. This is in the form of a rewindable cable 41 between the foot pedal 5 and the drive wheel 19. The cable, e.g., can comprise 3 to 5 windings on the foot pedal, resp., 2–3 windings on the wheel 19. In contrast to a conventional chain drive, an auxiliary cable 41 of this kind with only one strand, which is reversible and which does not require any lubrication, can also be of a very simple design. When starting, the cable is rewound onto the wheel 19, subsequently for a maximum of 3 revolutions it is wound onto the foot pedal, then uncoupled and rewound once again. During the next starting, the cable 41 then can be coupled once again.

FIG. 8 illustrates an example of a two-seat multi-track vehicle with two front wheels and one or two rear wheels 19. The drive motor module 18 is designed as a rocker drive 54 with a motor 11, e.g., a synchronous belt or a chain as a speed reducing transmission 12 and if so required with a switchable free-wheel system or with a clutch (43). For a driver 60 and a passenger, a reclining seat each is foreseen, with which the pedal generator modules located far forwards 8.1, 8.2 are both driven by the driver and by the passenger with a flat position of their legs. The zero point of the pedal angle W1=0 (i.e., the top dead-centre point), here has a correspondingly flat position, while in the case of the normal bicycle of. FIG. 7 it is essentially directed upwards. The modular construction makes it possible to assign an own pedal generator 8.1, 8.2 to every passenger of a multi-seat vehicle and to also remove these if and so required. In an embodiment as a four-wheel vehicle, also two separate motor modules 18.1, 18.2 can be provided for driving the rear wheels 19.

Figure 9:
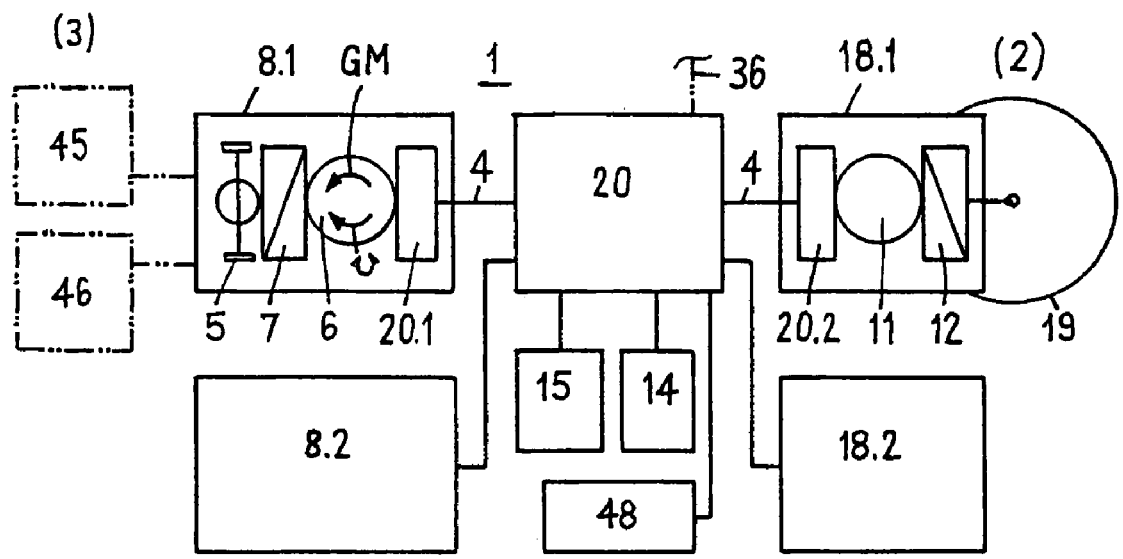
FIG. 9 schematically a drive system with modules.

This is shown in the schematic illustration of the modular construction according to FIG. 9. It is possible to utilise one, two or also more pedal generator modules 8.1, 8.2 and equally one or more motor modules 18.1, 18.2, depending on the type- and the application of the vehicle, resp., according to user requirements. This modular concept enables an economical and cost-effective manufacture for a multitude of applications. In doing so, the pedal generator modules 8 and the motor modules 18 can optionally also each comprise the direct generator control system 20.1, resp., motor control system 20.2 (they are, however, components of the overall control system 20).

Above all in vehicles, particularly light and efficient generators 6 and motors 11 are utilised, apart from light carbon brush motors, e.g., also electronically commutating ("brushless") DC—motors and generators. In a lightweight vehicle, which does not require an eccentric operating mode, as a particularly simple and efficient version a single-phase, brushless DC—generator can be utilised, which comprises a correspondingly more simple single-phase control system with a higher efficiency.

In the case of the application of the drive system 1 in a stationary training apparatus 3, for the purpose of dissipating the generated pedalling energy in concentric training, also electric-, mechanical- or fluid brakes 45, such as brake resistors, eddy current brakes, friction brake pads, gas- and liquid damping elements or mechanical storage devices 46, such as spring-power storage devices or gas- or fluid pressure storage devices can be assigned to the foot pedal 5 and the generator 6. The necessary drive power of the generator in motor operation (in accordance with characteristics Er, Ev in FIG. 6), in the case of eccentric training, can also be acquired through a mains power connection 36. Naturally, alternating with concentric training Gv an electric storage device 14 can be loaded and discharged again with eccentric training Er.

Figure 10:
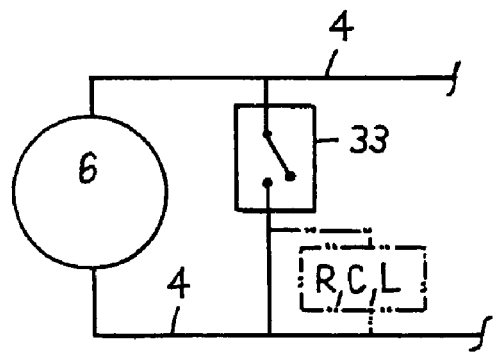
FIG. 10 a generator with a short-circuit starting circuit.

FIG. 10 illustrates a particularly simple example of an embodiment for the generation of a standstill pedal resistance TW and of a sufficiently high starting moment MA on the foot pedal. To do so, the generator 6 is shortcircuited directly by means of an electric switch 33 or through resistors R, capacitors C and coils L. The electric switch is closed with the electric control system 20 switched off, so that also then a sufficient pedal resistance TW is present. By a brief switching on and-off ("choppering") of the electric switch 33 during the start-up from standstill up to an operational pedalling frequency of, e.g., 50 rpm, the high starting moment MA can be produced.

For the generation of a standstill pedal resistance already at a pedalling frequency of f=0, it is also possible to utilise additional standstill braking 71 (refer to FIG. 3), e.g., in the form of a mechanical brake, which is also effective with the electric control system 20 switched off and which immediately after starting, e.g., already at a pedalling frequency of a few rpm, is released again.

A standstill braking in principle can also be produced by means of a corresponding control of the generator as a motor, which, however, is only effective very briefly, e.g., from W=0 to 5° (FIG. 2), resp., f=0 to 3 rpm (FIG. 3).

A preferred optimum angular position of the pedal for starting can, as previously, be achieved by backpedalling, e.g., by means of a blockable free-wheel system on the generator or by the generator control in the reverse pedalling direction r only producing a small resistance or load moment. As a further variant, the pedal can also be slowly brought to a starting position preferred and programmed by the user, when the system has not been used for some time, and/or the control system after some time can revert to a non-operative (idle) condition.

In a current-saving non-operative (idle) condition, the electronics can also monitor the pedal position.

Normally the system is switched on with a main switch, it is also possible, however, to provide an automatic run-up (autoboot), e.g., by conscious moving of the foot pedal as information to start-up the system, wherein the movement generates electric power and with this is in a position to switch on the electronics.

FIG. 11 depicts an example of a light, compact, flat pedal generator module 8 with a brushless synchronous motor with permanent magnet on a rotor 61 with a relatively large diameter and a stator 62 on a fixed module housing 63, which also carries the planet wheels of an epicyclic gear 7.2. An external gear wheel 65 is connected with the pedal crank shaft 64. With this single-stage compact transmission, e.g., transmission ratios of 7–10 from the pedal 5 to the generator 6 can be achieved with a correspondingly high moment multiplication. I.e., a necessary starting resistance or load moment MA of 50 Nm on the pedal with a 10:1 transmission ratio on the generator only necessitates 5 Nm. If for a particularly simple version of the module 8 no transmission is provided, then the motor should be very flat and designed with a large diameter, in order to be able to achieve greater starting moments MA. A (switchable or blockable) free-wheel system 42 can also be incorporated between the foot pedal 5 and generator 6, e.g., on the external gear wheel 65 or on the rotor 61. As an example of an adjustable geometry, here a possible variable crank length (pedal radius, excursion) L, L' is illustrated.

With the drive system in accordance with the invention 1 in case of a utilisation in vehicles, driving programs 25 of the most diverse kind, for example, with characteristic switching according to FIG. 3, can be incorporated or a parking program for maneuvering at low speeds up to, for example, 5 km/h (also selectable), where the driving speed of the vehicle is directly electrically proportionally coupled with the pedalling speed, so that one therefore with the pedal movement can maneuver forwards and backwards just as well as with a fixed mechanical transmission. As a further important example, e.g., also a power amplifying driving program can be selected, with which proportional to the muscle-power applied at the foot pedal additional electric power is conducted to the motor from the electric storage device 14. This power amplification factor can also be designed to be selectable, so that, e.g., for overtaking operations or on gradients a higher amplification factor can be set. The factor can also be negative, so that, e.g., only 80% of the pedal power is made use of for driving and 20% for charging the batteries. By means of various sensors 37 on the foot pedal, generator, motor and drive wheel, a multitude of data can be recorded, resp., also parameters for the driving programs entered. Sensors and measurement transducers of this type (FIG. 1) can be, e.g., direction sensors, position-and angle of rotation sensors, frequency-, power- and moment sensors, etc. With this, a large number of operating data, such as muscle-power and motor power, speeds, efficiencies, driving resistance or load, energy balance, etc., can be continually recorded and, for example, stored in an internal storage device 29. The data storage device 29 can also be designed to be removable. For this purpose, e.g., a commercially available electronic pocket diary can be utilised, which not only records conventional tachometer data, such as speed, route length, etc., in function of the driving time, but also pedal power, pedalling frequency and possible heart beat rate. Coupled to a computer, the pocket diary can balance these data, e.g., as a training diary. With a removable data storage device, over and above this a closing function by its removal can be implemented, as well as a switching-on function by the plugging-in of an external data storage device 29. In stationary training, in analogy different operating programs 24 or stationary riding programs can be adjustable and selectable. An external interface 35 serves for the outputting of riding-and operating data to an external device 38, which subsequently, e.g., can be evaluated and displayed on a PC. Or also an operating program combined with a video game or a video display of riding route can be played back and ridden or driven.

It is also possible to program driving-/riding routes oneself, and e.g., to optimally ride or drive a defined test route in the application as a training apparatus in accordance with various criteria e.g., as quickly as possible, with an optimum efficiency or with an optimum energy balance (muscle energy, motor energy, storage capacity and riding-/driving performance).

Within the scope of this description, the following designations are used:

| | |
|---|---|
| 1 | electric drive system |
| 2 | vehicle |
| 3 | stationary training apparatus |
| 4 | electric transmission |
| 5 | foot pedal (muscle-powered drive unit) |
| 6 | generator |
| 7 | generator transmission |
| 7.1 | synchronous belt transmission |
| 7.2 | epicyclic gear |
| 8 | pedal generator module |
| 10 | electric consumer |
| 11 | drive motor |
| 11a, 11b | different drive motors |
| 12 | motor transmission |
| 14 | electric storage device |
| 15 | super capacitor |
| 18 | motor module |
| 19 | wheel, drive wheel |
| 20 | electric control system |
| 20.1 | generator control system |
| 20.2 | motor control system |
| 21 | control program for the generator |

-continued

| | |
|---|---|
| 22 | starting control |
| 23 | motor operation control for 6 |
| 24 | operating programs |
| 25 | driving -/riding programs |
| 29 | data storage device |
| 30 | input - and display device |
| 31 | bi-directional converter |
| 33 | electric switch on 6 |
| 35 | interface for external connections |
| 36 | mains power connection |
| 37 | sensors, measurement transducers |
| 38 | external devices |
| 41 | rewindable cable |
| 42 | blockable free-wheel system |
| 43 | switchable clutch |
| 45 | brakes |
| 46 | mechanical storage devices |
| 48 | additional energy sources |
| 52 | seat/saddle |
| 53 | chassis |
| 54 | rocker drive crank |
| 56 | training stand |
| 57 | braking roller |
| 60 | driver/rider |
| 61 | rotor |
| 62 | stator |
| 63 | housing |
| 64 | shaft |
| 65 | external gear wheel |
| 70 | previous moment -/torque characteristics |
| 71 | standstill braking |
| V, Vmin | speed |
| f | pedalling frequency of 5 |
| b, bmax | acceleration of f |
| GM | counter moment, load moment |
| TW | pedal resistance at standstill |
| M, M1, Gv, Er, Ev, Br, Bv | moments/torques at 5 |
| MA | starting (resistance) moment on 5 |
| W | starting angle on 5 |
| W1 | pedal angle |
| F | tangential pedal force |
| L | excursion/leverage, pedal radius |
| t | time |
| v, r | forwards, backwards (pedalling direction) |

The invention claimed is:

1. An electric drive system operated with muscle-power (1) for a vehicle (2), said electric drive system comprising a foot pedal (5) and a generator (6) mechanically connected to the foot pedal, an electric transmission (4) from the generator (6) to a drive motor (11), and an electric control system (20), wherein the electric control system comprises a control program (21) of the generator (6), with which a counter moment (GM) on the generator, related to the forwards pedaling direction (v), is generatable,
wherein the drive system comprises a starting control (22) of the generator with which, when the foot pedal is actuated from standstill, an immediately occurring pedal resistance (TW) is generated and with which a high starting moment (MA) is generated at the foot pedal when starting from standstill up to a minimum riding speed.

2. The drive system in accordance with claim 1, wherein the standstill pedal resistance (TW) corresponds to an actuation force (F) on the foot pedal (5) of at least 200 N.

3. The drive system according to claim 1, wherein the starting moment (MA) at the foot pedal amounts to at least 40 Nm.

4. The drive system in accordance with claim 1, wherein the starting control (22) of the generator is controlled such that the starting acceleration of the foot pedal (bmax) on average amounts to a maximum of 4 rad/sec$^2$.

5. The drive system according to claim 1, wherein a resistance or load moment (M1) of the generator is modulated in phase with a pedal angle (W1).

6. The drive system in accordance with claim 1, wherein a standstill braking (71) of the foot pedal is active, which produces a standstill pedal resistance (TW) and which is also effective in case the electric control system (20) is switched off.

7. The drive system according to claim 1, wherein the generator is short-circuited by an electric switch (33) and wherein the electric switch, in case the electric control system (20) is switched off, is closed to generate the pedal resistance (TW).

8. The drive system in accordance with claim 7, wherein the high starting moment (MA) is generated by briefly switching on and switching off (choppering) the electric switch (33).

9. The drive system according to claim 1, wherein the generator control program (21) comprises several moment characteristics (M60, M120), which are able to be changed over between, and which increase within, a normal range of the pedaling frequency.

10. The drive system according to claim 1, wherein at least one of brakes (45) and mechanical storage devices (46) are assigned to the foot pedal (5) and to the generator (6).

11. The drive system in accordance with claim 1, wherein at least one of a blockable free-wheel system (42) and a switchable clutch (43) is provided between the foot pedal and the generator.

12. The drive system according to claim 1, wherein the drive system comprises modular units, said modular units being selected from the group consisting of a pedal generator module (8) with foot pedal (5), generator (6), a possible speed transmission (7) and generator control system (20.1), a control module (20) and a drive motor module (18) with motor (11), a possible speed reduction transmission (12) and a motor control system (20.2).

13. The drive system in accordance with claim 1, wherein electric storage devices (14) are provided as short-term storage devices.

14. The drive system according to claim 1, further comprising two differently designed motors, (11a, 11b), each respectively for higher and a lower speed range.

15. The drive system according to claim 1, wherein operating data selected from the group consisting of moments, torques, powers, and revolutions per min on the foot pedal are recorded and indicated.

16. The drive system according to claim 1, further comprising an interface (35) for connecting external devices.

17. The drive system in accordance with claim 1, further comprising a removable data storage device (29), said removable data storage device being operable, when removed, to carry out a closing function of the system.

18. The drive system according to claim 1, wherein the electric circuit comprises operating programs (24) for utilization in training apparatuses.

19. The drive system in accordance with claim 1, wherein the electric control system (20) after a selectable time interval, during which no traveling motion takes place, goes over into one of an inoperative condition and idle condition.

20. The drive system according to claim 1, wherein the foot pedal (5) comprises a changeable geometry.

21. A vehicle with a drive system in accordance with claim 1.

* * * * *

UNITED STATES PATENT AND TRADEMARK OFFICE
CERTIFICATE OF CORRECTION

PATENT NO.      : 7,156,780 B1
APPLICATION NO. : 09/937945
DATED           : January 2, 2007
INVENTOR(S)     : Fuchs et al.

It is certified that error appears in the above-identified patent and that said Letters Patent is hereby corrected as shown below:

On the Title Page, item [30], Foreign Application Priority Data, delete "(SE)" and insert --(CH)--.

Signed and Sealed this

Sixth Day of March, 2007

JON W. DUDAS
*Director of the United States Patent and Trademark Office*